United States Patent [19]
Kraft et al.

[11] 3,765,563
[45] Oct. 16, 1973

[54] SAFETY LOCK FOR PRESSURE COOKER HANDLE

[76] Inventors: Paul Kraft, Am Linsenbrunnen 1, Ingen, Steige; Karl Oberlander, Eberhardstr. 61, Geisl, Ingel, Steige, both of Germany

[22] Filed: July 22, 1971

[21] Appl. No.: 165,314

Related U.S. Application Data

[62] Division of Ser. No. 790,107, Jan. 9, 1969, Pat. No. 3,641,920.

[52] U.S. Cl. .......................... 220/55.3, 220/55 PC
[51] Int. Cl. ............................................ A47j 27/08
[58] Field of Search ............................ 99/340, 339; 220/23.83, 23.86, 40, 44, 40 S, 55.0, 94 B, 96, 94 R, 55 PC, 55.7, 55.3; 292/256.6, 256.67

[56] References Cited
UNITED STATES PATENTS
2,191,975  2/1940  Stephens .................... 220/55 PC
2,334,448  11/1943  Sheridan .................... 220/55 PC

*Primary Examiner*—Leon G. Machlin
*Attorney*—Woodhams, Blanchard & Flynn

[57] ABSTRACT

A handle for a steam pressure cooker, said handle having a safety means comprising a two arm rocking lever having a gasket engaging arm and a lid blocking arm and a stem discharge channel.

16 Claims, 2 Drawing Figures

FIG. 1
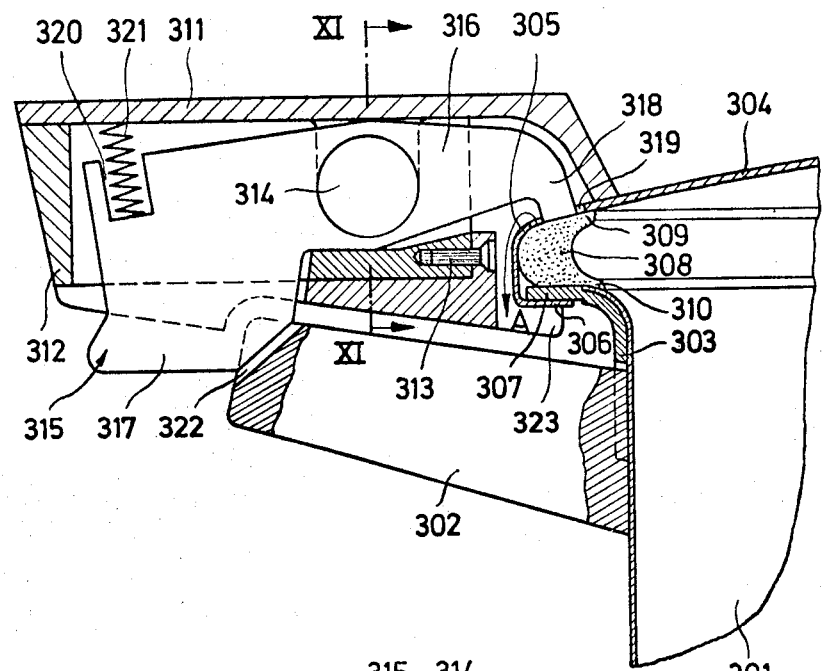
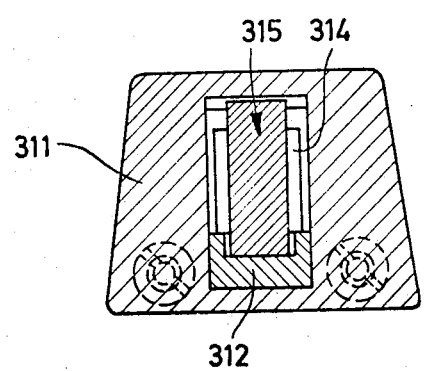
FIG. 2

SAFETY LOCK FOR PRESSURE COOKER HANDLE

This application is a division of our copending application Ser. No. 790,107, filed Jan. 9, 1969, now U.S. Pat. No. 3,641,920, issued Feb. 15, 1972.

It is the purpose of the invention to produce a safety device for a set of cooking utensils for selective steam pressure cooking, which safety device excludes an opening under steam pressure and is simple and sturdy in construction, which is easily manufacturable and operable and is safe to use in the case of inattentive handling of the cooking apparatus.

To attain said purpose, the invention provides that the steam pressure cooking lid which is provided with a handle is provided with a safety device to prevent an opening under pressure, said safety device consisting of a one-piece, two-armed rockng lever which is supported in the lid handle, the one arm of said rocking lever forming a pressure element with its free end, which pressure element lifts off the gasket ring from its seat through a recess in the lid when the rocking lever is in acting position, and the other arm of which projects out of the lid handle and forms a locking member which prevents, when the rocking lever is in a rest position, a rotation of the lid relative to the cooking utensil.

The safety device of the invention assures that the steam pressure is discharged before opening of the lid and the safety device is simply and inexpensively manufacturable, has a room-saving construction and is easy to be handled. The safety device assures an accident-free operation since it is provided with only one single movable structural part. The end of the rocking lever projecting from the handle is being gripped during the placing of the lid on the utensil and also during its removal therefrom together with the lid handle and is being operated automatically upon closing of the hand. Therefore, the locking member is not being stressed through careless attempts to open the lid without releasing the locking member. In placing the lid on the utensil, the sealing effect is lifted as long as the lid handle is being gripped which makes closing of the lid easier, particularly if hot contents are in the pot. The handles on the lid and the pot can be of a short construction because of the reduced required strength. Thus, storage of the cooking apparatus and the lid requires only little room.

The second lever arm projects advantageously from the underside of the lid handle and engages in its locking position in a recess of a pot handle. Thus, locking of the lid is accomplished in a particularly simple manner which does not require any special attention of the operator because the lid and the pot handle must be always rotated one on top of the other for the locking position. The provision of a recess in the pot handle does not significantly increase the manufacture expenses because no movable parts must be provided. If the pot is provided with two oppositely arranged handles, as this is normally the case, then both can be provided with a recess so that only one type of handle must be manufactured and beyond that still less attention is required during placing of the lid on the pot. Furthermore, an automatic locking can be obtained in a simple manner by constructing the second lever arm acting as a locking member heavier than the first one. Thus, said second lever arm will engage the recess through its own weight and be maintained therein. The lever projecting downwardly from the lid handle is furthermore being gripped by the front finger joints of the operator's hand during gripping of the lid handle, thus is pressed upwardly out of the closing position with certainty before rotation of the lid.

In a preferred embodiment, the rocking lever is urged by a spring which presses said rocking lever into the locking position. The spring is an additional safety device for the locking position of the lever on the pot and reminds the user of the provision of a lock through the resistance with which said spring opposes a lifting of the lever arm during a gripping of the handle. Furthermore, said spring relieves the gasket ring by holding back the pressure element even if the lid is stored in a position in which the own weight of the second lever arm cannot act.

The first lever arm can have a nose functioning as a pressure release element at its free end. The nose makes it possible to lift the gasket ring, in the zone of one of its lip-shaped ends, off from the lid contrary to the known, above-described pressure pin. This requires a smaller force and also protects the gasket ring.

In an advantageous development of the safety device of the invention, the lid handle has a discharge channel for the steam connected to the recess in the lid. The discharging steam finds a resistance-free path which assures a quick discharge. At the same time, the discharging steam is forced in a direction which prevents the operator from getting burnt. The discharge channel opens up advantageously at the underside of the lid handle since the operator's hand during discharge of the steam is known and a discharge direction in an upward direction would hit the face, and thereby be dangerous.

As an additional assurance against burning of the hand of the operator during gripping of the lid and releasing the lock, the discharge channel can be sealed against the lever through at least one compressible insert.

The lever and the spring can be arranged in a frame part. The safety device is thus advantageously simply mountable. The lid handle has a decorative appearance.

The recess in the pot handle can advantageously be provided with parallel side surfaces which safely prevent an unintentional sliding out of the lever arm which acts as a locking member upon rotation of the lid. Furthermore, the pot handle can have on both sides abutting surfaces rising to the upper edge of the recess. Upon rotation of the lid into the locking position, the lever arm is pressed upwardly and the nose is thus pressed against the gasket ring even if the operator does not also grip around the lever arm. In this manner, the lid is in any case rotated to an unsealed condition so that, even if the contents in the pot are hot, no pressure can form as yet which would make the rotation difficult. Moreover, the engagement of the lever into the recess can be noted clearly so that the operator will know that the locking position has been reached.

A device can advantageously be arranged on the support which device is engaged by the lever arm in locking position, said lever arm being used as a locking member. For such a set of cooking utensils in which handles are mounted to the support, said handles have recesses for the lever arm.

Further advantages and details of the invention will become apparent from the following description of the several embodiments illustrated in the drawings, in which:

FIG. 1 is a cross-sectional view of a safety device for the set of cooking utensils of the invention: and FIG. 2 is a cross-sectional view along the line XI—XI of FIG. 1.

The cooking utensil, illustrated in the fragmentary view of FIG. 1, for steam pressure cooking comprises a pot 301 with a handle 302, a support 303 for a lid 304 for steam pressure cooking, said support being secured to the pot 301, said lid comprising not-illustrated devices, like a safety valve and a pressure indicator. The pot 301 belongs to a set of pots of variable construction each of which can be connected to the support 303 and can thus be used for steam pressure cooking.

The lid 304 has a downwardly curved edge 305 with inwardly curved, segmentally shaped claws 306 which form a type of a slide lock together with segmental flaps 307 at the support. The slide lock is being closed by a suitable rotation of the lid and the support and prevents the lifting off of the lid 304 when pressure exists in the pot 301. A gasket ring 308 is inserted in the lid edge 305 in such a manner that its upper sealing lip 309 abuts against the inner side of the lid 304 in the zone of the edge, while the lower sealing lip 310 abuts against the segmental flaps 307. The gasket ring 308 thus makes possible a pressure increase in the pot 301 whereby the excess pressure further increases the sealing effect.

A lid handle 311 is secured to the lid 304. A frame part 312 is inserted in said lid handle 311 and is secured by means of a counter-sunk screw 313. A rocking lever 315 is supported in the frame part 312 by means of a pin 314, said rocking lever having a first lever arm 316 and a second lever arm 317. The first lever arm is provided with a nose 318 which acts onto the gasket ring 308 in the zone of its upper lip 309 through a recess 319 mounted in the lid 304 in the area of the handle 311.

The second lever arm 317 projects downwardly out of the handle 311 in the locking position illustrated in FIG. 1 and has in this zone a key-shaped construction. A spring 321 is arranged in a recess 320 of the second lever arm 317, said spring being constructed as a pressure spring and being supported on the lid handle 311 in such a manner that it presses the lever arm 317 out of the lid handle 311. The nose is in this position at the same time held back from the gasket ring 308. If the lid 304 on the pot 301 is rotated into the illustrated closed position, the lid handle 311 is positioned exactly above the pot handle 302. The crossbar of the pot handle 302 has a recess 322 with walls which are parallel to one another, which recess is engaged by the lever arm 317 under the pressure of the spring 321. The lid 304 and the pot 301 are locked to prevent relative rotation in this locking position of the lever 315. It is necessary for opening to pivot the lever 315 against the pressure of the spring 321 whereby the nose 318 of the lever arm 316 presses against the sealing lip 309 of the gasket ring 308. In case that an excess pressure is still provided in the pot, the steam can be discharged through the recess 319 of the lid and can discharge downwardly in direction of the arrow A through a discharge channel 323 in the lid handle.

In order to make the engagement of the lever arm 317 into the recess 322 at the pot handle easier and to maintain the lever in open position until the engagement takes place, the crossbar of the pot handle 302 is provided on both sides of the recess 322 with abutting surfaces rising up to said recess, which abutting surfaces for purposes of clarification are not illustrated in FIG. 1.

The embodiments of the invention in which an exclusive property or privilege is claimed are defined as follows:

1. In a steam pressure cooking utensil having a steam pressure cooking lid cooperable with an abutment secured to a container for locking said lid to said container and an annular gasket for sealing said lid to said container, the improvement comprising:

a handle secured to said lid having a safety means thereon, said safety means comprising a two arm lever pivotally supported on said handle for movement between a first locking position and a second position, one arm of said two arm lever engaging said gasket and moving said gasket from engagement with its bearing surface upon a pivoting motion of said two arm lever to said second position, the other arm of said two arm lever defining a blocking member for preventing a removal of said lid from said container when said two arm lever is in said first locking position.

2. The improvement according to claim 1, wherein said other arm projects from the underside of the lid handle and engages, in said first locking position, a recess in a pot handle.

3. The improvement according to claim 2, wherein the rocking lever is urged by a spring into the first locking position.

4. The improvement according to claim 3, wherein the spring is arranged in a recess of a lever arm of the rocking lever.

5. The improvement according to claim 1, wherein said one lever arm has a nose at its free end as a pressure element.

6. The improvement according to claim 1, wherein the lid handle is provided with a discharge channel for the steam which is connected to the recess in the lid.

7. The improvement according to claim 6, wherein the discharge channel discharges to the underside of the lid handle.

8. The improvement according to claim 7, wherein the discharge channel is sealed against the lever by at least one compressible insert.

9. The improvement according to claim 3, wherein the lever and the spring are arranged in a frame part insertable into the lid handle.

10. The improvement according to claim 9, wherein the lever is supported in the frame part by means of a pin.

11. The improvement according to claim 10, wherein the lever and the pin are one piece.

12. The improvement according to claim 1, wherein the end of the other arm, which is used as a locking member and which projects from the lid handle, is provided with a key-type grip surface.

13. The improvement according to claim 12, wherein the key-type grip surface has two parallel side surfaces on the pot handle.

14. The improvement according to claim 13, wherein the pot handle has abutting surfaces rising on both sides to the upper edge of the recess.

15. The improvement according to claim 1, wherein a device is arranged on the support, which device is engaged in locking position by the other arm which is used as a locking member.

16. The improvement according to claim 15, wherein a recess for engaging the lever arm used as a locking member is provided in the handle of the support.

* * * * *